US007054295B1

(12) United States Patent
Nitta

(10) Patent No.: US 7,054,295 B1
(45) Date of Patent: May 30, 2006

(54) METHOD OF TRANSMISSION FROM TCP/IP COMMUNICATION NETWORK TO MOBILE COMMUNICATION NETWORK AND TRANSMISSION AND RECEPTION SYSTEM THEREFOR

(75) Inventor: Toshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 1258 days.

(21) Appl. No.: 09/589,086

(22) Filed: Jun. 8, 2000

(30) Foreign Application Priority Data

Jun. 9, 1999 (JP) ................................ 11-162553

(51) Int. Cl.
*H04Q 7/24* (2006.01)
*H04J 3/24* (2006.01)
*H04L 12/66* (2006.01)

(52) U.S. Cl. .................... 370/338; 370/349; 370/352
(58) Field of Classification Search ................ 370/338, 370/349, 352, 356, 354, 401, 328, 329, 389, 370/395.1, 395.5, 395.52; 455/557, 422.1, 455/439, 450, 509
See application file for complete search history.

(56) References Cited

U.S. PATENT DOCUMENTS

| | | | |
|---|---|---|---|
| 5,131,029 A | | 7/1992 | Kunstadt |
| 5,590,133 A * | | 12/1996 | Billstrom et al. ............ 370/349 |
| 5,948,069 A | | 9/1999 | Kitai et al. |
| 5,956,331 A * | | 9/1999 | Rautiola et al. ............ 370/338 |
| 6,009,088 A | | 12/1999 | Taguchi et al. |
| 6,246,688 B1 * | | 6/2001 | Angwin et al. ............. 370/401 |
| 6,385,195 B1 * | | 5/2002 | Sicher et al. ................ 370/356 |
| 6,434,140 B1 * | | 8/2002 | Barany et al. .............. 370/352 |
| 6,504,839 B1 * | | 1/2003 | Valentine et al. ........... 370/354 |
| 6,519,252 B1 * | | 2/2003 | Sallberg ..................... 370/356 |
| 6,614,780 B1 * | | 9/2003 | Hakim et al. ............... 370/352 |
| 6,625,472 B1 * | | 9/2003 | Farazmandnia et al. .... 455/557 |

FOREIGN PATENT DOCUMENTS

| | | |
|---|---|---|
| EP | 0 812 085 A1 | 12/1997 |
| JP | 5-207072 | 8/1993 |
| JP | 9-93304 | 4/1997 |
| JP | 11-27290 | 1/1999 |
| JP | 11-32087 | 2/1999 |
| JP | 11-88433 | 3/1999 |
| WO | WO 97/16007 | 5/1997 |
| WO | WO97/23977 | 7/1997 |

* cited by examiner

*Primary Examiner*—Alpus H. Hsu
*Assistant Examiner*—Lee Khuong
(74) *Attorney, Agent, or Firm*—Foley and Lardner

(57) ABSTRACT

The TCP/IP mobile communication network transmission and reception system for conducting transmission from a TCP/IP communication network to a mobile communication network includes a provider access server for the connection of a TCP/IP communication network to receive an IP packet in which an IP address of a mobile communication terminal as a destination of transmission from the TCP/IP communication network is stored at a header, and a mobile communication switching system for extracting an IP address from a header of an IP packet sent from the provider access server and searching for a user's telephone number corresponding to the IP address to send an originating signal and a selection signal based on the searched user's telephone number to a mobile communication network on the side of said mobile communication terminal.

13 Claims, 7 Drawing Sheets

FIG. 4

| IP ADDRESS | | | | USER'S TELEPHONE NUMBER |
|---|---|---|---|---|
| a1a2a3 | b1b2b3 | c1c2c3 | d1d2 0 | 090 – ✱✱✱✱ – ×××0 |
| a1a2a3 | b1b2b3 | c1c2c3 | d1d2 1 | 090 – ✱✱✱✱ – ×××1 |
| a1a2a3 | b1b2b3 | c1c2c3 | d1d2 2 | 090 – ✱✱✱✱ – ×××2 |
| a1a2a3 | b1b2b3 | c1c2c3 | d1d2 3 | 090 – ✱✱✱✱ – ×××3 |
| a1a2a3 | b1b2b3 | c1c2c3 | d1d2 4 | 090 – ✱✱✱✱ – ×××4 |
| a1a2a3 | b1b2b3 | c1c2c3 | d1d2 5 | 090 – ✱✱✱✱ – ×××5 |
| a1a2a3 | b1b2b3 | c1c2c3 | d1d2 6 | 090 – ✱✱✱✱ – ×××6 |
| a1a2a3 | b1b2b3 | c1c2c3 | d1d2 7 | 090 – ✱✱✱✱ – ×××7 |

METHOD OF TRANSMISSION FROM TCP/IP COMMUNICATION NETWORK TO MOBILE COMMUNICATION NETWORK AND TRANSMISSION AND RECEPTION SYSTEM THEREFOR

BACKGROUND OF THE INVENTION

1. Field of the Invention

The present invention relates to communication between a mobile communication network for a personal digital cellular telecommunication system (PDC) etc. and a TCP/IP (Transmission Control Protocol/Internet Protocol) communication network and, more particularly, to a method of transmission from a TCP/IP communication network to a mobile communication network for conducting transmission from a TCP/IP communication network to a mobile communication terminal accommodated in a mobile communication network for a personal digital cellular telecommunication system etc. (reception at the mobile communication terminal side) and a transmission and reception system therefor.

2. Description of the Related Art

Conventionally proposed is a technique of transferring data from a terminal (personal computer) and the like accommodated in a TCP/IP communication network (intranet, Internet, extranet) to a non-TCP/IP communication network, for example, the mobile communication terminal accommodated in a mobile communication network for a personal digital cellular telecommunication system (PDC) (e.g. "Method and System for Enabling Mobile Station to Participate in Data Communication" recited in Japanese Patent Laying-Open (Kokai) No. Heisei 11-27290).

Such a mobile communication terminal in a personal digital cellular telecommunication system conducts communication with a TCP/IP communication network through this mobile communication network. In this case, transmission from a mobile communication terminal to an Internet service provider is possible, while transmission using an IP packet from an Internet user (a terminal accommodated in the TCP/IP communication network) to a mobile communication terminal through an Internet service provider (reception at the mobile communication terminal side) is not possible in some cases.

FIG. 5 is a block diagram showing a structure of a conventional mobile communication system and FIG. 6 is a block diagram showing a structure of main components of a provider connection interworking function device for establishing Internet connection in the conventional mobile communication system. FIG. 7 is a diagram showing a sequence at the time of Internet connection in the conventional mobile communication system (transmission from a mobile communication terminal).

In FIG. 5, a data terminal (DTE) 1 such as a general-purpose small-sized computer (PC) conducts transmission to a terminal (e.g. personal computer) accommodated in the Internet (AT command (ATD)). In response to this transmission, a data communication adapter (MS-ADP) 2, a mobile communication terminal (MS) 3, a radio base station (BTS) 4, a radio base station control device (BSC) 5 and a mobile communication switching system (MSC) 6 (calling processing device (CP) 6c/time-division switch (TDNW) 6a) are sequentially connected through a line by setup. At the mobile communication switching system 6, by the processing by the calling processing device 6c/the time-division switch 6a, a seizing signal (SEZ) is sent out to a provider connection interworking function device (PRV-IWF) 6b.

The provider connection interworking function device 6b returns an acknowledge (ACK) in response to the seizing signal (SEZ) to the mobile communication switching system 6. The mobile communication switching system 6 sets a radio-side path. The data communication adapter 2 and the provider connection interworking function device 6b set an automatic retransmission request (ARQ).

The provider connection interworking function device 6b returns an answer (ANS) to the mobile communication switching system 6. The mobile communication switching system 6 sets a network-side path. The data terminal 1 sends an Internet protocol/transmission control protocol/synchronizing signal (IP+TCP(SYN)) to an access server (ACC-SER) 7 in an Internet service provider (ISP) 8. The access server 7 sends out the Internet protocol/transmission control protocol/synchronizing signal (IP+TCP (SYN)) to an Internet 9. Thereafter, between the data terminal 1 and a terminal not shown which is accommodated in the Internet 9, HTML data transmission etc. is conducted by TCP/IP link open.

In FIG. 6, at the provider connection interworking function device 6b, terminating processing circuits (ARQ-RX and ARQ-TX) 10a and 10b conduct terminating processing of an error control protocol on the side of a radio line. Asynchronous terminating processing circuits (ASYNC-RX and ASYNC-TX) 11a and 11b conduct terminating processing with respect to communication over a serial asynchronous line with the access server 7 on the side of the Internet service provider 8.

In this operation, the calling processing device 6c of the mobile communication switching system 6 controls the time-division switch 6a to set a user data transfer channel and a control channel with the radio base station control device 5. Also, an approach link is set between the radio base station (BTS) 4 and the radio base station control device (BSC) 5.

As described in the foregoing, the above conventional art fails to enable an Internet user (terminal) to conduct transmission using an IP packet to a mobile communication terminal (reception at the mobile communication terminal side) through an Internet service provider, which accordingly makes, for example, HTML data transmission impossible and causes inconvenience in use.

SUMMARY OF THE INVENTION

An object of the present invention is to solve such problems of conventional art as mentioned above and provide a method of conducting transmission from a TCP/IP communication network to a mobile communication network which allows a relatively simple structure to realize transmission using an IP packet to a mobile communication terminal accommodated in a mobile communication network for a personal digital cellular telecommunication system etc. from a terminal accommodated in a TCP/IP communication network (reception at the mobile communication terminal side) while allowing facility in use to be improved, and a transmission and reception system therefor.

Another object of the present invention is to provide a method of conducting transmission from a TCP/IP communication network to a mobile communication network which allows a user of the TCP/IP communication network to freely set an IP address and a user's telephone number to further improve its convenience and a transmission and reception system therefor.

According to one aspect of the invention, a TCP/IP mobile communication network transmission and reception system for conducting transmission from a TCP/IP communication network to a mobile communication network, comprises a provider access server for the connection of a TCP/IP communication network to receive an IP packet in which an IP address of a mobile communication terminal as a destination of transmission from the TCP/IP communication network is stored at a header, and a mobile communication switching system for extracting an IP address from a header of an IP packet sent from the provider access server and searching for a user's telephone number corresponding to the IP address to send an originating signal and a selection signal based on the searched user's telephone number to a mobile communication network on the side of the mobile communication terminal.

In the preferred construction, the mobile communication switching system includes a time-division switch for conducting time-division switching of line switching, a provider connection interworking function device for extracting an IP address of the mobile communication terminal as a transmission destination stored in an IP packet sent from the provider access server and searching for a user's telephone number corresponding to the IP address to output a selection signal and an originating signal based on the searched user's telephone number, an originating signal detection circuit for detecting an originating signal from the provider connection interworking function device, a selection signal reception circuit for receiving a selection signal from the provider connection interworking function device, and a calling processing device for executing control to send an originating signal from the originating signal detection circuit and a selection signal from the selection signal reception circuit to the mobile communication network on the side of the mobile communication terminal.

In another preferred construction, the provider connection interworking function device includes a terminating processing circuit for conducting terminating processing of an error control protocol on the side of a radio line, an asynchronous terminating processing circuit for conducting terminating processing with respect to communication on a serial asynchronous line with the provider access server for TCP/IP communication network line connection, a synchronous pattern detection circuit for detecting a synchronous pattern to determine first arrival of an IP packet transferred through the asynchronous terminating processing circuit, an IP address/telephone number converting circuit for searching for a user's telephone number corresponding to an IP address of the mobile communication terminal as a transmission destination which is stored in a header of an IP packet from the synchronous pattern detection circuit, and a transmission signal sending circuit for sending out an originating signal and a selection signal to the mobile communication switching system based on a user's telephone number from the IP address/telephone number converting circuit.

In another preferred construction, the IP address/telephone number converting circuit includes an IP address/telephone number conversion table which stores a user's telephone number corresponding to an IP address.

In another preferred construction, the mobile communication network is a mobile communication network in a personal digital cellular telecommunication system (PDC).

In another preferred construction, the mobile communication network is a mobile communication network to which the PIAFS standard in the personal handy phone system (PHS) is applied.

In another preferred construction, an IP address and a user's telephone number in the IP address/telephone number conversion table are set by a manager of the mobile communication network accommodating the mobile communication switching system.

In another preferred construction, an IP address and a user's telephone number in the IP address/telephone number conversion table are set through a terminal accommodated in the TCP/IP communication network by the execution of a communication control protocol for the IP address/telephone number conversion table of the IP address/telephone number converting circuit.

In another preferred construction, the provider access server and the mobile communication switching system conduct switching connection for the transmission from the mobile communication terminal accommodated in the mobile communication network to the TCP/IP communication network.

In another preferred construction, the TCP/IP mobile communication network transmission and reception system further comprises as well as the mobile communication terminal, a data terminal mounted at least with a browser, and a modulator and demodulator for enabling the data terminal to conduct transmission to the TCP/IP communication network through the mobile communication terminal, wherein data including letters and images by means of IP packets is transmitted from the TCP/IP communication network.

According to another aspect of the invention, a method of conducting transmission from a TCP/IP communication network to a mobile communication network, comprising the steps of sending out an IP packet in which an IP address of a mobile communication terminal as a transmission destination is stored at a header from a TCP/IP communication network, receiving the IP packet from the TCP/IP communication network, and extracting the IP address from the header of the received IP packet and searching for a user's telephone number corresponding to the IP address to send an originating signal and a selection signal based on the searched user's telephone number to a mobile communication network on the side of the mobile communication terminal.

In the preferred construction, the mobile communication network is a mobile communication network in a personal digital cellular telecommunication system (PDC).

In another preferred construction, the mobile communication network is a mobile communication network to which the PIAFS standard in the personal handy phone system (PHS) is applied.

In another preferred construction, switching connection for the transmission from the mobile communication terminal accommodated in the mobile communication network to the TCP/IP communication network is conducted.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 4 is a diagram showing the contents of an IP address/telephone number conversion table illustrated in FIG. 1;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Detailed description will be made of an embodiment of the present invention implementing a method of conducting transmission from a TCP/IP communication network to a mobile communication network and a transmission and reception system therefor with reference to the drawings.

Figure 5:
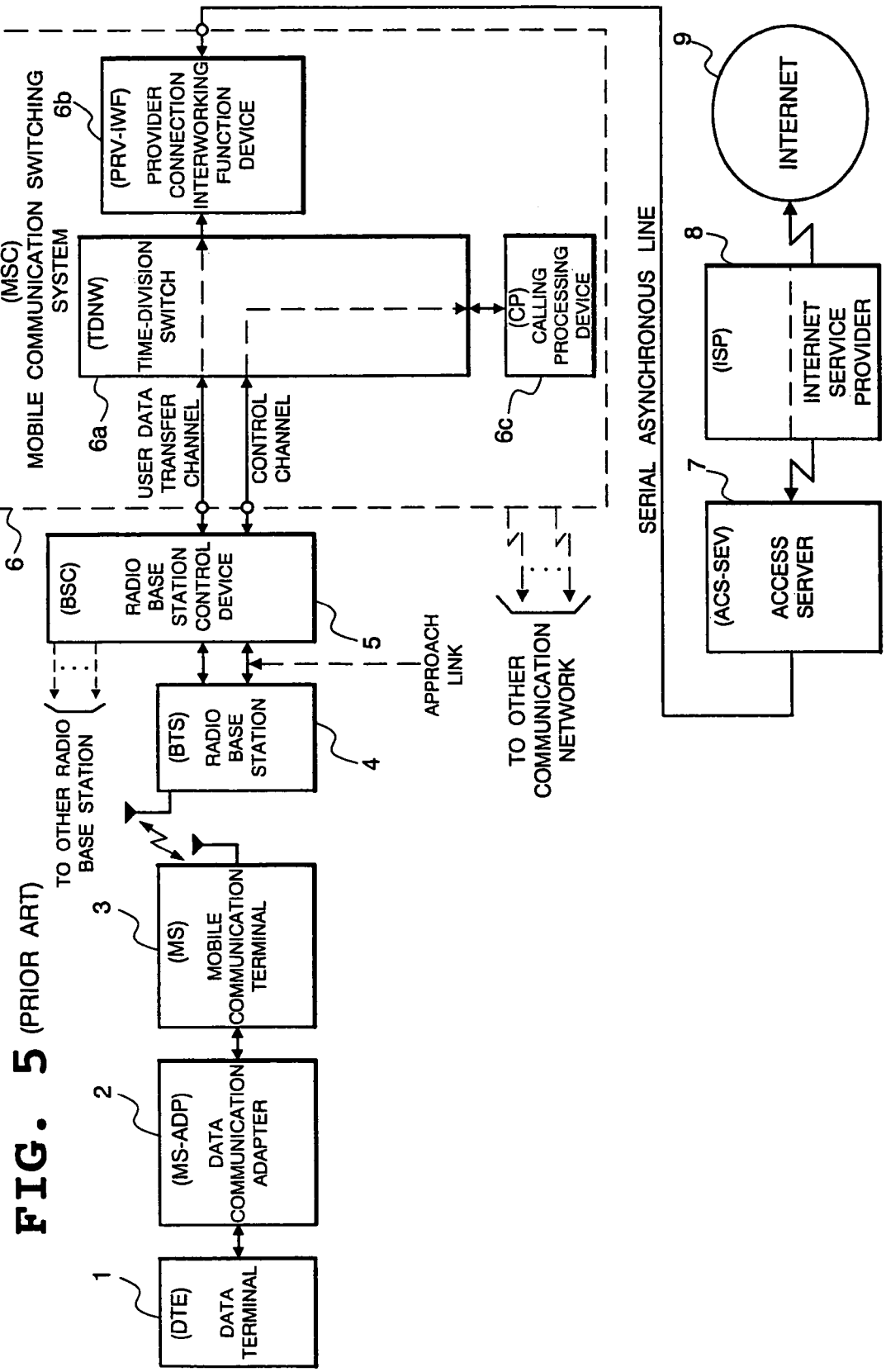
FIG. 5 is a block diagram showing a structure of a conventional mobile communication system.
Figure 6:
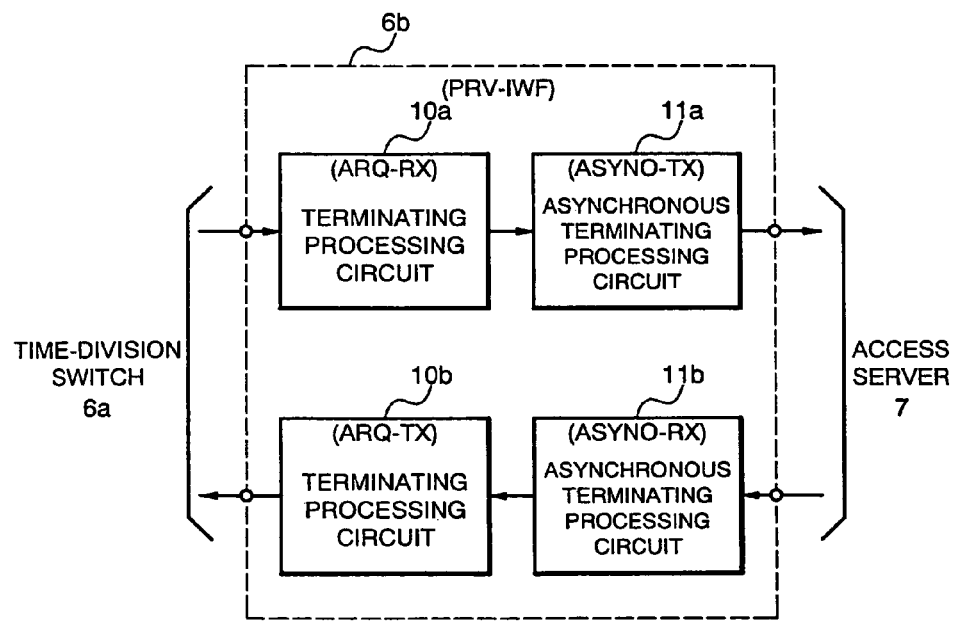
FIG. 6 is a block diagram showing a functional structure of a provider connection interworking function device for Internet connection in the conventional mobile communication system.

In the drawings and description set forth below, the same components as those in FIG. 5 are allotted the same reference numerals.

Figure 1:
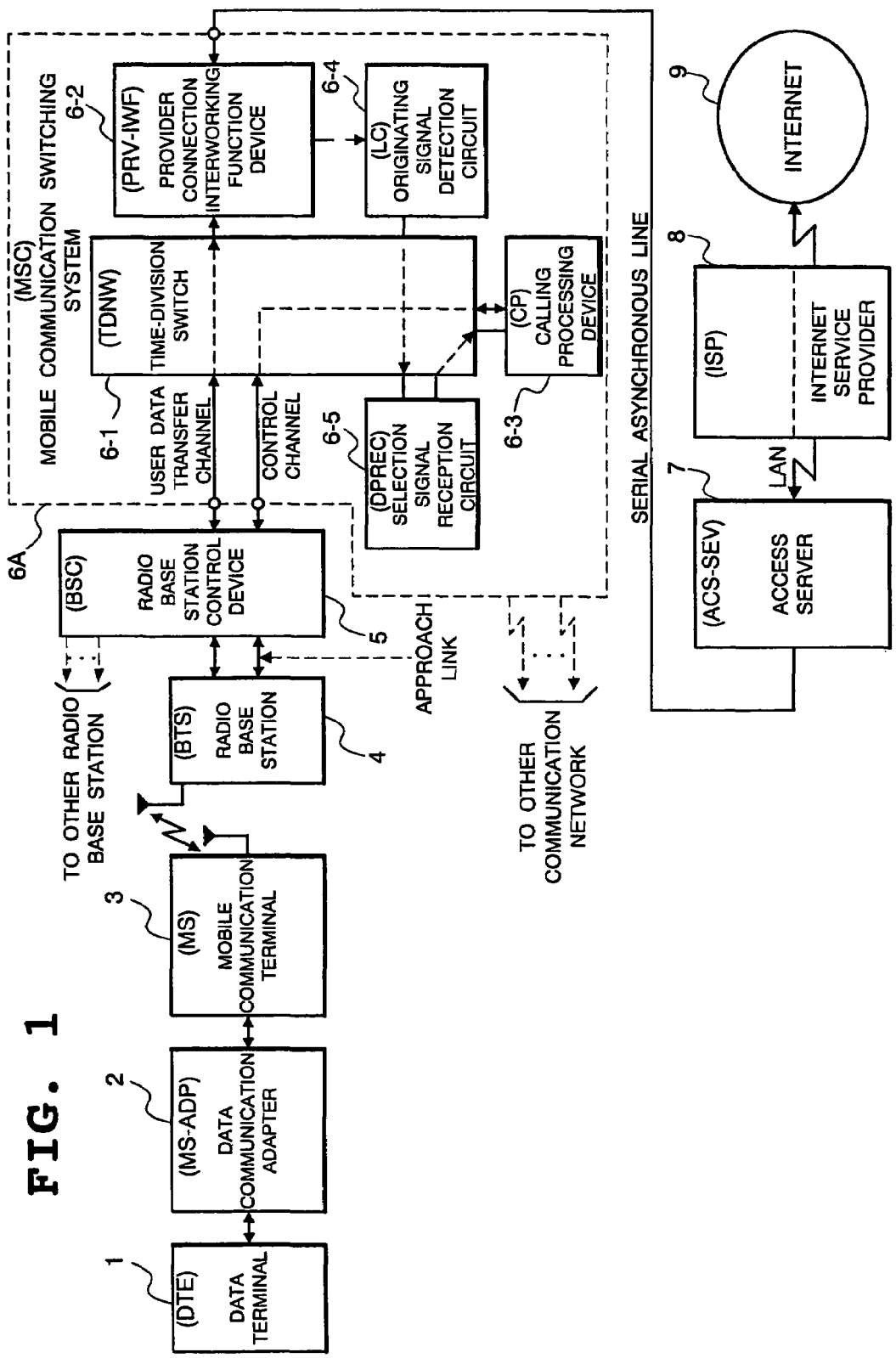
FIG. 1 is a block diagram showing a structure for use in an embodiment of the present invention implementing a method of conducting transmission from a TCP/IP communication network to a mobile communication network and a transmission and reception system therefor.

FIG. 1 is a block diagram showing a structure for use in an embodiment of the present invention implementing a method of conducting transmission from a TCP/IP communication network to a mobile communication network and a transmission and reception system therefor.

In FIG. 1, the present example includes a data terminal (DTE) 1 such as a general-purpose small-sized computer (PC), a data communication adapter (MS-ADP) 2 such as a modulator and demodulator (MODEM) for enabling the data terminal 1 to conduct transmission and reception to and from a mobile communication network, and a mobile communication terminal 3 (MS) such as a portable telephone or a mobile data terminal. These are components for accessing an Internet 9 for a Web page by HTML data transmission through the mobile communication terminal 3 (portable telephone), for transmitting and receiving an electronic mail and for making an Internet telephone which will be described later.

This structure also includes a radio base station (BTS) 4 which will be connected through a line to the mobile communication terminal 3 in a radio zone within a service area (cell), a radio base station control device (BSC) 5 which accommodates the radio base station 4, and a mobile communication switching system (MSC) 6A which will connect to the radio base station control device 5 based on a common channel signaling system etc. to establish switching connection with a radio communication network (PDC/PHS) and a wired communication network (ISDN/PSTN).

This example further includes a time-division switch (TDNW) 6-1 for processing time-division with respect to line switching connection, a calling processing device (CP) 6-3 for executing calling control processing with respect to the mobile communication terminal 3 and a provider connection interworking function device (PRV-IWF) 6-2 for the connection with a provider (an access server/asynchronous serial-LAN protocol converter 7 and an Internet service provider 8 which will be described later), all of which components are provided in the mobile communication switching system 6A.

The example also includes an originating signal detection circuit (LC) 6-4 for detecting an originating signal (e.g. loop signal) from the provider connection interworking function device 6-2 and a selection signal reception circuit (DPREC) 6-5 for receiving a selection signal (a dial pulse string and a dual tone/push button (PB) signal) from the provider connection interworking function device 6-2 which signal is received through the originating signal detection circuit 6-4.

In addition, the example includes the access server (ACC-SER/asynchronous serial-LAN protocol converter) 7 as a provider access server for sending out an IP packet, the Internet service provider (ISP) 8 and the Internet 9.

Figure 2:
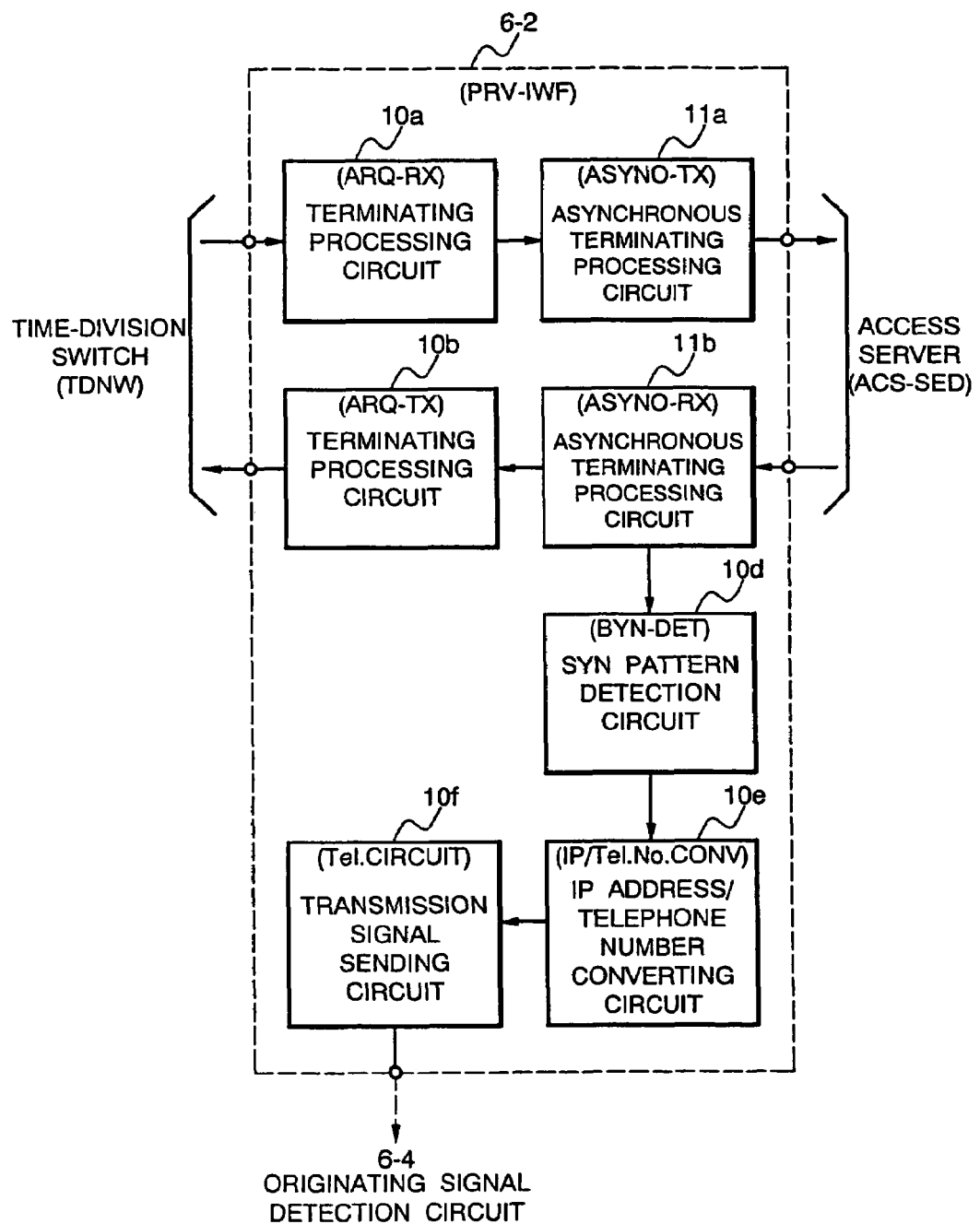
FIG. 2 is a block diagram showing a structure of main components of a provider connection interworking function device illustrated in FIG. 1.

FIG. 2 is a block diagram showing a structure of main components of the provider connection interworking function device 6-2. The provider connection interworking function device 6-2 includes terminating processing circuits (ARQ-RX and ARQ-TX) 10a and 10b for conducting terminating processing of an error control protocol on the side of the radio line, asynchronous terminating processing circuits (ASYNC-RX and ASYNC-TX) 11a and 11b for conducting terminating processing with respect to communication on a serial asynchronous line with the access server 7 on the side of the Internet service provider (ISP) 8, and an SYN pattern detection circuit (SYN-DET) 10d for detecting an SYN (synchronizing signal) pattern in an IP packet sent from the access server 7 on the side of the Internet service provider 8.

The provider connection interworking function device 6-2 also includes an IP address/telephone number converting circuit (IP/Tel. No. CONV) 10e having an IP address/telephone number conversion table (see FIG. 4) for converting an IP address into a telephone number and a transmission signal sending circuit (Tel. Circuit) 10f for sending an off-hook signal (originating signal/loop signal) and a dial signal (selection signal) to the mobile communication switching system 6A.

Next, operation of the present embodiment will be described.

Figure 7:
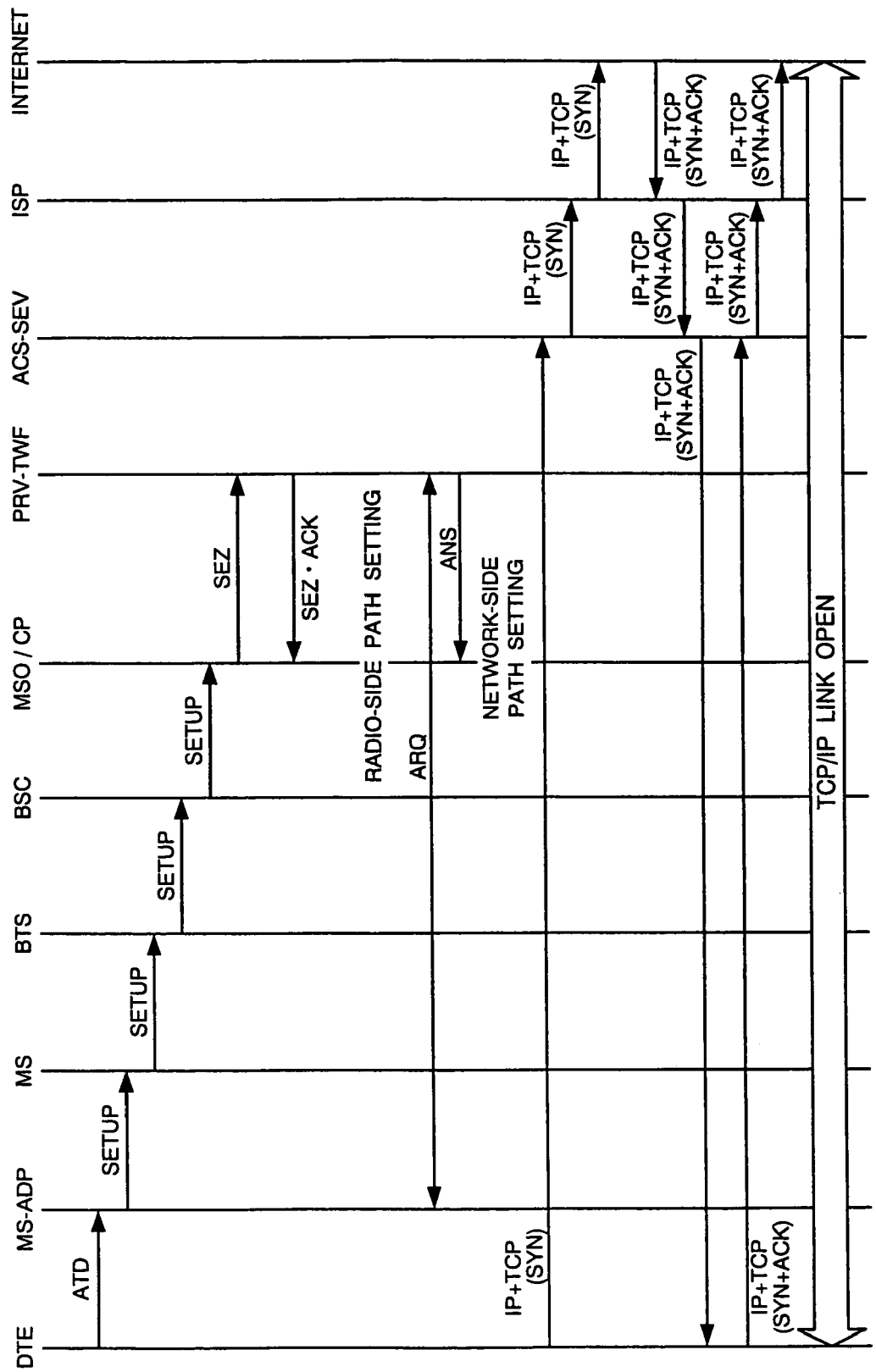
FIG. 7 is a diagram showing a sequence at Internet connection in the conventional mobile communication system.

First, operation of calling from the mobile communication terminal (MS) 3 to the Internet 9 (sequence) will be described in brief. The calling operation (sequence) is the same as that of the above-described conventional example illustrated in FIG. 7.

The mobile communication terminal 3, which is connected to the data terminal 1 through the data communication adapter 2, connects to the radio base station 4 in a radio zone (radio line). The radio base station control device 5 which accommodates numerous radio base stations 4 is connected to the mobile communication switching system 6A through a line. Through the line connection with the mobile communication switching system 6A, the mobile communication terminal 3 conducts transmission to a radio communication network (PDC/PHS) or a wired communication network (ISDN/PSTN) and responds to reception.

When the mobile communication terminal 3 accesses the Internet 9, its line connection with the provider connection interworking function device 6-2 provided in the mobile communication switching system 6A is established through the above-described line connection with the mobile communication switching system 6A. The mobile communication switching system 6A is connected to the provider connection interworking function device 6-2 and the access server 7 (Internet service provider 8) to process the interface with the Internet 9.

Furthermore, the provider connection interworking function device 6-2 and the access server 7 are connected to each other through a line, so that the terminal 3 accesses the Internet 9 through the Internet service provider 8 to conduct HTML data transmission. For example, a Web page is accessed, or an electronic mail transmitted by the data terminal 1 is sent to an IP address destination of the Internet 9 (a Web page device accommodated in a terminal/Internet and a small-sized general-purpose computer for electronic mail). In some cases, Internet telephone conversation which will be described later is made.

In such access operation from the mobile communication terminal 3 to the Internet 9, the time-division switch 6-1 in the mobile communication switching system 6A sets a user data transfer channel and a control channel and conducts time-division processing, the calling processing device 6-3 executes calling processing control with respect to the mobile communication terminal 3 and furthermore, the provider connection interworking function device 6-2 establishes line connection with a provider (access server 7 and the Internet service provider 8).

In the provider connection interworking function device 6-2 shown in FIG. 2, the terminating processing circuits 10a and 10b conduct terminating processing of the error control protocol on the side of the radio line and the asynchronous terminating processing circuits 11a and 11b conduct terminating processing with respect to the communication on a serial asynchronous line with the access server 7 on the side of the Internet service provider 8.

Next, description will be made of operation of conducting transmission from the Internet 9 to the mobile communication terminal 3.

Figure 3:
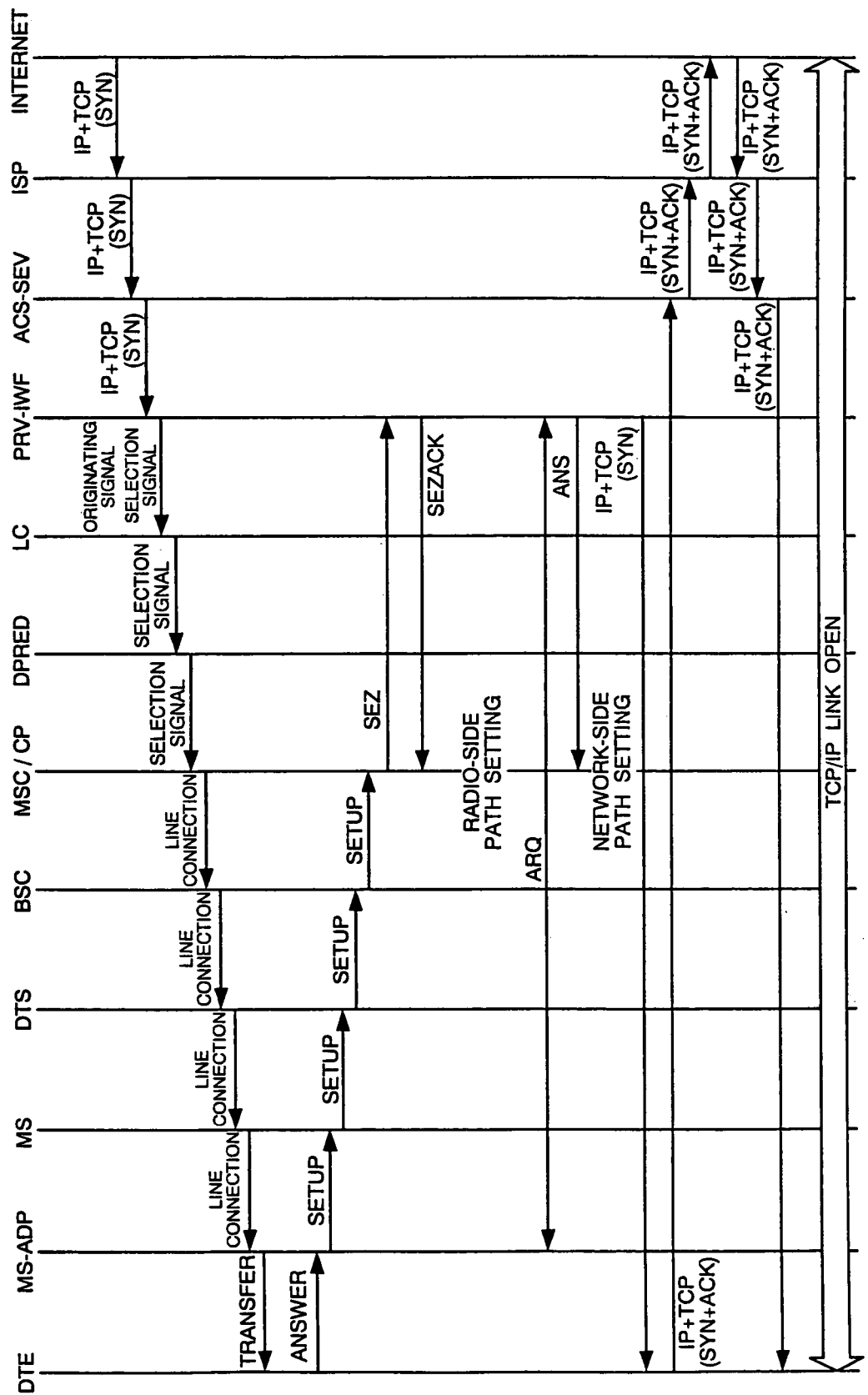
FIG. 3 is a diagram showing a sequence at the execution of transmission from the Internet to a mobile communication terminal in the present embodiment.

FIG. 3 is a sequence diagram showing processing at the transmission from the Internet 9 to the mobile communication terminal 3, and FIG. 4 is a diagram for use in explaining the contents of an IP address/telephone number conversion table in the IP address/telephone number converting circuit 10e illustrated in FIG. 2.

In order to conduct transmission to the mobile communication terminal 3 from a terminal or the like accommodated in the Internet 9, set in advance at the IP address/telephone number conversion table in the IP address/telephone number converting circuit 10e as shown in FIG. 4 are user's telephone numbers (090-\*\*\*\*-XXX 0~7) of numbers of mobile communication terminals 3 as transmission targets which are made one-to-one corresponding to IP addresses (a1a2a3 b1b2b3 c1c2c3 d1d2 0~7).

In order to conduct transmission to the desired mobile communication terminal 3 from a terminal accommodated in the Internet 9, connect to an access point in the Internet 9 to transmit an IP address in the IP address/telephone number conversion table shown in FIG. 4. The IP address is transferred to the access server 7 on the side of the Internet service provider 8 as the Internet protocol/transmission control protocol/synchronizing signal IP+TCP(SYN) shown in FIG. 3 and further transferred to the provider connection interworking function device 6-2.

At the provider connection interworking function device 6-2, user data to be transferred from the access server 7 to the terminating processing circuit 10b shown in FIG. 2 is extracted by its preceding stage asynchronous terminating processing circuit 11b to extract a header of an IP packet which will be output to the SYN pattern detection circuit 10d. The SYN pattern detection circuit 10d detects an SYN (synchronizing signal) pattern in the IP packet.

The SYN pattern is the one that is first sent to the mobile communication switching system 6A from the Internet 9 as a transmission source at the setting of a TCP connection. Detection of the SYN pattern finds out the first arrival of an IP packet, whereby calling to the mobile communication switching system 6A will be conducted.

The header is applied to the IP address/telephone number converting circuit 10e through the SYN pattern detection circuit 10d. The IP address/telephone number converting circuit 10e searches for a user's telephone number of the mobile communication terminal 3 corresponding to the IP address in the header. In this search, the IP address/telephone number conversion table shown in FIG. 4 is checked.

More specifically, a user's telephone number of the mobile communication terminal 3 one-to-one corresponding to the IP address of the transmission destination is searched for and extracted. The user's telephone number is applied to the transmission signal sending circuit 10f. The transmission signal sending circuit 10f outputs an originating signal to the mobile communication switching system 6A and sends out a dial signal (selection signal/dial pulse string and dual tone/push button (PB) signal) to the originating signal detection circuit 6-4.

The originating signal detection circuit 6-4 detects the originating signal and the selection signal reception circuit 6-5 receives the user's telephone number (selection signal) from the originating signal detection circuit 6-4. The selection signal reception circuit 6-5 transfers the originating signal and the user's telephone number to the calling processing device 6-3 (originating signal ORG/selection signal in FIG. 3).

The selection signal establishes line connection with the radio base station control device 5 through the time-division switch 6-1 in the mobile communication switching system 6A to further establish line connection to the radio base station 4. Subsequently, the radio base station 4 and the mobile communication terminal 3 are connected through a radio line. The mobile communication terminal 3 is connected to the data terminal 1 through the interface of the data communication adapter 2.

The data terminal 1 returns an answer. As a result, the data communication adapter 2, the mobile communication terminal 3, the radio base station 4, the radio base station control device 5 and the mobile communication switching system 6A (calling processing device 6-3, time-division switch 6-1) are sequentially connected through a line by setup. The mobile communication switching system 6A sends out a seizing signal/(SEZ) to the provider connection interworking function device 6-2.

The provider connection interworking function device 6-2 returns an acknowledge (ACK) in response to the seizing signal (SEZ) to the mobile communication switching system 6A through the data communication adapter 2, the mobile communication terminal 3, the radio base station 4 and the radio base station control device 5. The mobile communication switching system 6A sets a radio-side path. The data communication adapter 2 and the provider connection interworking function device 6-2 set an automatic retransmission request (ARQ).

The provider connection interworking function device 6-2 returns an answer (ANS) to the mobile communication switching system 6A. The mobile communication switching system 6A sets a network-side path. The data terminal 1 sends out the IP address and the Internet protocol/transmission control protocol/synchronizing signal (IP+TCP(SYN)) to the access server 7, which are further transferred to the Internet 9 through the Internet service provider 8. Thereafter, by TCP/IP link open between the data terminal 1 and the Internet 9, HTML data transmission is conducted between a terminal accommodated in the Internet 9 and the data terminal 1.

This HTML data transmission, in which data is transmitted in an IP packet in TCP/IP communication, will enable the data terminal 1 to transmit and receive an electronic mail to and from a terminal of the Internet 9. Also enabled is communication over a telephone. Telephone communication is realized with software such as "Internet Phone" and "Net Meeting" installed in the data terminal 1 and a terminal accommodated in the Internet 9 together with a Web browser and a transmitter/receiver (microphone/speaker etc.).

Thus, in the present embodiment, an SYN pattern is detected to find out the first arrival of an IP packet. As a result, calling to the mobile communication switching system 6A is allowed to enable transmission from a terminal accommodated in the Internet 9 to the mobile communication terminal 3 (reception at the mobile communication terminal 3).

Moreover, only by adding the originating signal detection circuit 6-4 and the selection signal reception circuit 6-5 to the mobile communication switching system 6A and conducting control of transmission of the circuits, an IP packet can be received at the mobile communication terminal 3 with ease.

An IP address/user's telephone number stored in the IP address/telephone number conversion table in the IP address/telephone number converting circuit 10e at the provider connection interworking function device 6-2 is set by a manager of the mobile communication network who arranges the mobile communication switching system 6A.

The IP address/user's telephone number can be set also by a user through a terminal (computer) accommodated in the Internet 9. In this case, a communication control device which executes a communication control protocol for this setting is connected to the provider connection interworking function device 6-2 to conduct control for newly setting or modifying an IP address/user's telephone number in the IP address/telephone number conversion table. Also in the terminal accommodated in the Internet 9, a communication control protocol for newly setting or modifying an IP address/user's telephone number is installed to change the setting.

Setting through the terminal (computer) accommodated in the Internet 9 is also possible, for example, by access to a Web page opened on the Internet 9 by the manger of the mobile communication switching system 6A. In this case, for example, a CGI program is executed to set its IP address/telephone number conversion table at the IP address/telephone number conversion circuit 10e.

Although the present embodiment has been described with respect to a mobile communication network for a personal digital cellular telecommunication system (PDC) and the mobile communication terminal 3 thereof, it can be applied to other mobile phone systems. The present embodiment is applicable, for example, to a mobile phone system adopting a PIAFS (PHS Internet Access Forum Standard) in PHS.

As is clear from the foregoing description, according to the method of conducting transmission from a TCP/IP communication network to a mobile communication network and a transmission and reception system therefor of the present invention, an IP address of a mobile communication terminal as a transmission destination is extracted and a user's telephone number (originating signal and selection signal) corresponding to the IP address is sent to the mobile communication terminal of the mobile communication network.

As a result, as well as transmission from a mobile communication terminal accommodated in a mobile communication network for a personal digital cellular telecommunication system to a TCP/IP communication network which is conventionally possible, transmission from the TCP/IP communication network to the mobile communication terminal using an IP packet is enabled to improve convenience in use.

In addition, simply adding a circuit for detecting an originating signal and a circuit for receiving a selection signal to a conventional mobile communication switching system and controlling the transmission of the circuits enables transmission to a mobile communication terminal from a TCP/IP communication network using an IP packet with ease.

Moreover, according to the method of conducting transmission from a TCP/IP communication network to a mobile communication network and the transmission and reception system therefor of the present invention, an IP address and a user's telephone number in the IP address/telephone number conversion table are set by a manager of the mobile communication network or set by a terminal accommodated in the TCP/IP communication network through the execution of a communication control protocol.

As a result, a user of the TCP/IP communication network is allowed to freely set an IP address and a user's telephone number to further improve convenience in use.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A TCP/IP mobile communication network transmission and reception system for conducting transmission from a TCP/IP communication network to a mobile communication network, comprising:
- a provider access server for the connection of a TCP/IP communication network to receive an IP packet in which an IP address of a mobile communication terminal as a destination of transmission from the TCP/IP communication network is stored at a header; and
- a mobile communication switching system for extracting an IP address from a header of an IP packet sent from the provider access server and searching for a user's telephone number corresponding to the IP address to send an originating signal and a selection signal based on the searched user's telephone number to a mobile communication network on a side of said mobile communication terminal wherein said mobile communication switching system including
- a time-division switch for conducting time-division switching of line switching,
- a provider connection interworking function device for extracting said IP address of the mobile communication terminal as a transmission destination stored in the IP packet sent from the provider access server and searching for said user's telephone number corresponding to the IP address to output said selection signal and said originating signal based on the searched user's telephone number,
- an originating signal detection circuit for detecting said originating signal from the provider connection interworking function device,
- a selection signal reception circuit for receiving said selection signal from the provider connection interworking function device, and
- a calling processing device for executing control to send said originating signal from said originating signal detection circuit and said selection signal from said selection signal reception circuit to the mobile communication network on the side of said mobile communication terminal.

2. The TCP/IP mobile communication network transmission and reception system as set forth in claim 1, wherein
said provider connection interworking function device includes:
- a terminating processing circuit for conducting terminating processing of an error control protocol on the side of a radio line,
- an asynchronous terminating processing circuit for conducting terminating processing with respect to communication on a serial asynchronous line with the provider access server for TCP/IP communication network line connection,
- a synchronous pattern detection circuit for detecting a synchronous pattern to determine first arrival of said IP packet transferred through the asynchronous terminating processing circuit,
- an IP address/telephone number converting circuit for searching for the user's telephone number corresponding to said IP address of the mobile communication terminal as the transmission destination which is stored in said header of said IP packet from the synchronous pattern detection circuit, and
- a transmission signal sending circuit for sending out said originating signal and said selection signal to the mobile communication switching system based on said user's telephone number from the IP address/telephone number converting circuit.

3. The TCP/IP mobile communication network transmission and reception system as set forth in claim 2, wherein
said IP address/telephone number converting circuit includes:
an IP address/telephone number conversion table which stores the user's telephone number corresponding to said IP address.

4. The TCP/IP mobile communication network transmission and reception system as set forth in claim 3, wherein
said IP address and said user's telephone number in said IP address/telephone number conversion table are set by a manager of the mobile communication accommodating the mobile communication switching system.

5. The TCP/IP mobile communication network transmission and reception system as set forth in claim 3, wherein
said IP address and said user's telephone number in said IP address/telephone number conversion table are set through a terminal accommodated in the TCP/IP communication network by the execution of a communication control protocol for the IP address/telephone number conversion table of the IP address/telephone number converting circuit.

6. The TCP/IP mobile communication network transmission and reception system as set forth in claim 1, wherein
said mobile communication network comprises:
a personal digital cellular telecommunication system (PDC).

7. The TCP/IP mobile communication network transmission and reception system as set forth in claim 1, wherein
said mobile communication network comprises
a personal handy phone system (PHS) using a PHS Internet Access Forum Standard.

8. The TCP/IP mobile communication network transmission and reception system as set forth in claim 1, wherein
said provider access server and said mobile communication switching system conducts switching connection for the transmission from the mobile communication terminal accommodated in the mobile communication network to the TCP/IP communication network.

9. The TCP/IP mobile communication network transmission and reception system as set forth in claim 1, further comprising,
a data terminal including a browser, a modulator and demodulator for enabling said data terminal to conduct transmission to the TCP/IP communication network through the mobile communication terminal, wherein
data including letters and images by means of IP packets are transmitted from said TCP/IP communication network.

10. A method of conducting transmission from a TCP/IP communication network to a mobile communication network, comprising the steps of:
sending out an IP packet in which an IP address of a mobile communication terminal as a transmission destination is stored at a header from a TCP/IP communication network;
receiving the IP packet from the TCP/IP communication network; and
using a provider connection interworking function device, extracting the IP address from the header of the received IP packet and searching for a user's telephone number corresponding to the IP address to send an originating signal and a selection signal based on the searched user's telephone number to a mobile communication network on the side of said mobile communication terminal;

conducting time-division switching of line switching, using an originating signal detection circuit, detecting said originating signal; from the provider connection interworking function device, using a selection signal reception circuit, receiving said selection signal from the provider connection interworking function device, and using a calling processing device, executing control to send said originating signal from said originating signal detection circuit and said selection signal from said selection signal reception circuit to the mobile communication network on the side of said mobile communication terminal.

11. The method of conducting transmission from a TCP/IP communication network to a mobile communication network as set forth in claim 10, wherein said mobile communication network comprises a mobile communication network in a personal digital cellular telecommunication system (PDC).

12. The method of conducting transmission from a TCP/IP communication network to a mobile communication network as set forth in claim 10, wherein said mobile communication network comprises a personal handy phone system (PHS) using a PHS Internet Access Forum Standard.

13. The method of conducting transmission from a TCP/IP communication network to a mobile communication network as set forth in claim 10, wherein switching connection for the transmission from the mobile communication terminal accommodated in the mobile communication network to the TCP/IP communication network is conducted.

* * * * *